United States Patent [19]
Smith et al.

[11] Patent Number: 6,085,138
[45] Date of Patent: Jul. 4, 2000

[54] DIFFERENTIAL LOCK CONTROL SYSTEM

[75] Inventors: Jerry F. Smith, Clinton; David S. Suckow, Decatur, both of Ill.

[73] Assignee: Caterpillar Inc., Peoria, Ill.

[21] Appl. No.: 09/191,077

[22] Filed: Nov. 12, 1998

[51] Int. Cl.$^7$ ...................................................... G06F 7/70
[52] U.S. Cl. ................. 701/51; 701/50; 701/69; 701/88; 701/89; 172/3; 180/197
[58] Field of Search ................... 701/51, 50, 65, 701/69, 81, 88, 89; 172/3; 180/197

[56] References Cited

U.S. PATENT DOCUMENTS

| | | | |
|---|---|---|---|
| 4,474,080 | 10/1984 | Day ............................................. | 74/711 |
| 5,040,648 | 8/1991 | Mitchell et al. ........................ | 192/3.58 |
| 5,311,964 | 5/1994 | Miyazaki et al. ........................ | 180/306 |
| 5,489,007 | 2/1996 | Yesel ........................................ | 180/243 |
| 5,505,267 | 4/1996 | Orbach et al. ................................ | 172/3 |
| 5,574,643 | 11/1996 | Yesel .................................. | 364/426.02 |
| 5,802,489 | 9/1998 | Orbach et al. .............................. | 701/50 |

*Primary Examiner*—William A. Cuchlinski, Jr.
*Assistant Examiner*—Arthur D. Donnelly
*Attorney, Agent, or Firm*—Haverstock, Garrett & Roberts

[57] ABSTRACT

A differential lock control system for controlling the locking of the various differential assemblies associated with a particular work machine wherein such system includes a first switch positionable to select any one or more of the differential assemblies for operation in their locked condition, a second switch actuatable to control the locking of the differential assemblies selected by the first switch, a ground speed sensor for determining the ground speed of the work machine, an optional steering pressure sensor for determining the steering effort required to turn the wheels associated with the front axle, and an electronic controller coupled to the first and second switches and to the respective sensors for receiving signals therefrom, the controller outputting a signal to actuate the locking mechanism of the differential assemblies selected by the position of the first switch when the controller receives a signal indicative of the second switch being actuated, and a signal indicative of the ground speed being below a predetermined ground speed. In addition, if the locking mechanism of the front axle differential has been selected for actuation by the first switch, the controller will only lock-up the front axle differential when it receives an additional signal indicative of the steering effort being below a predetermined amount.

24 Claims, 5 Drawing Sheets

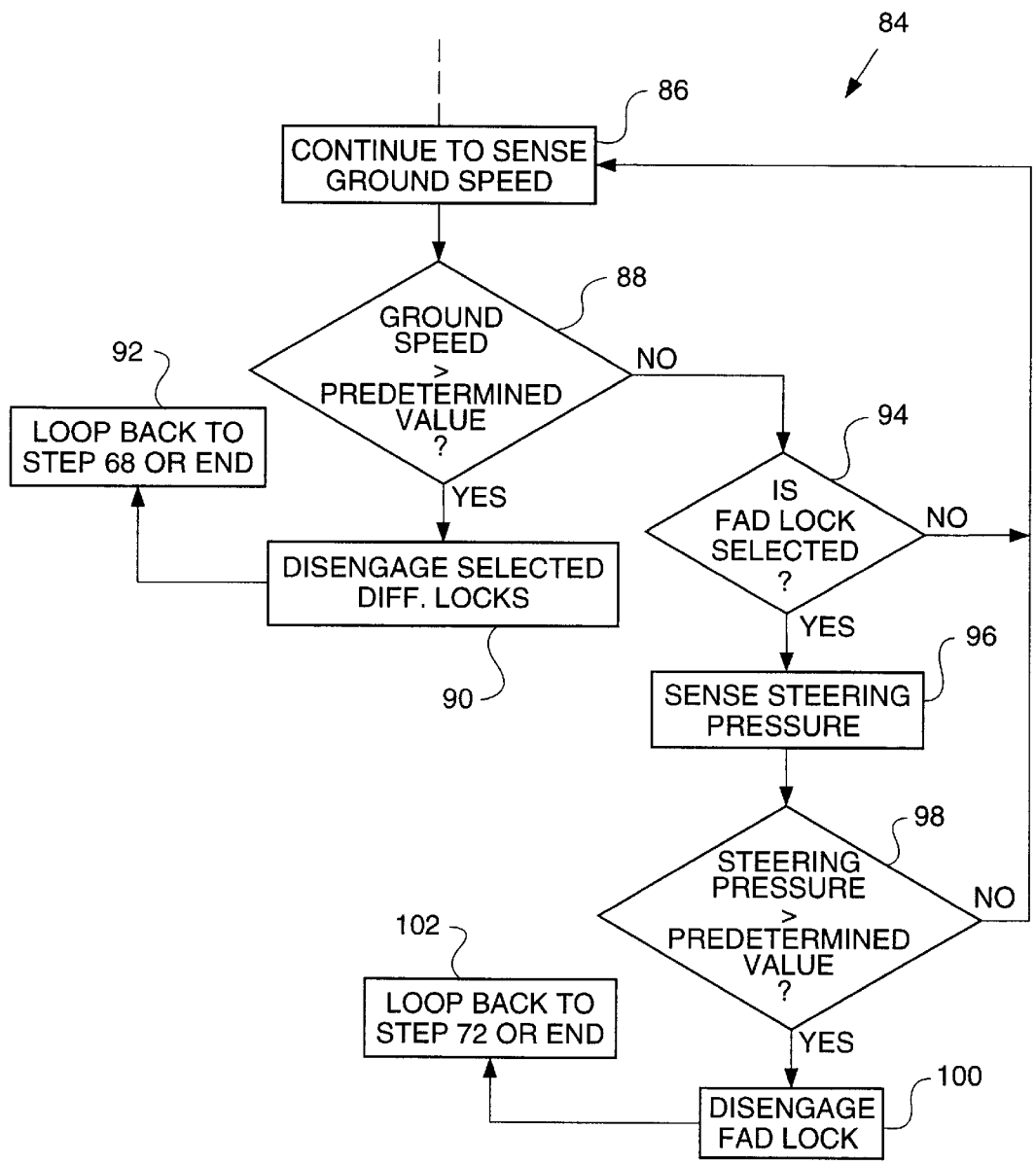

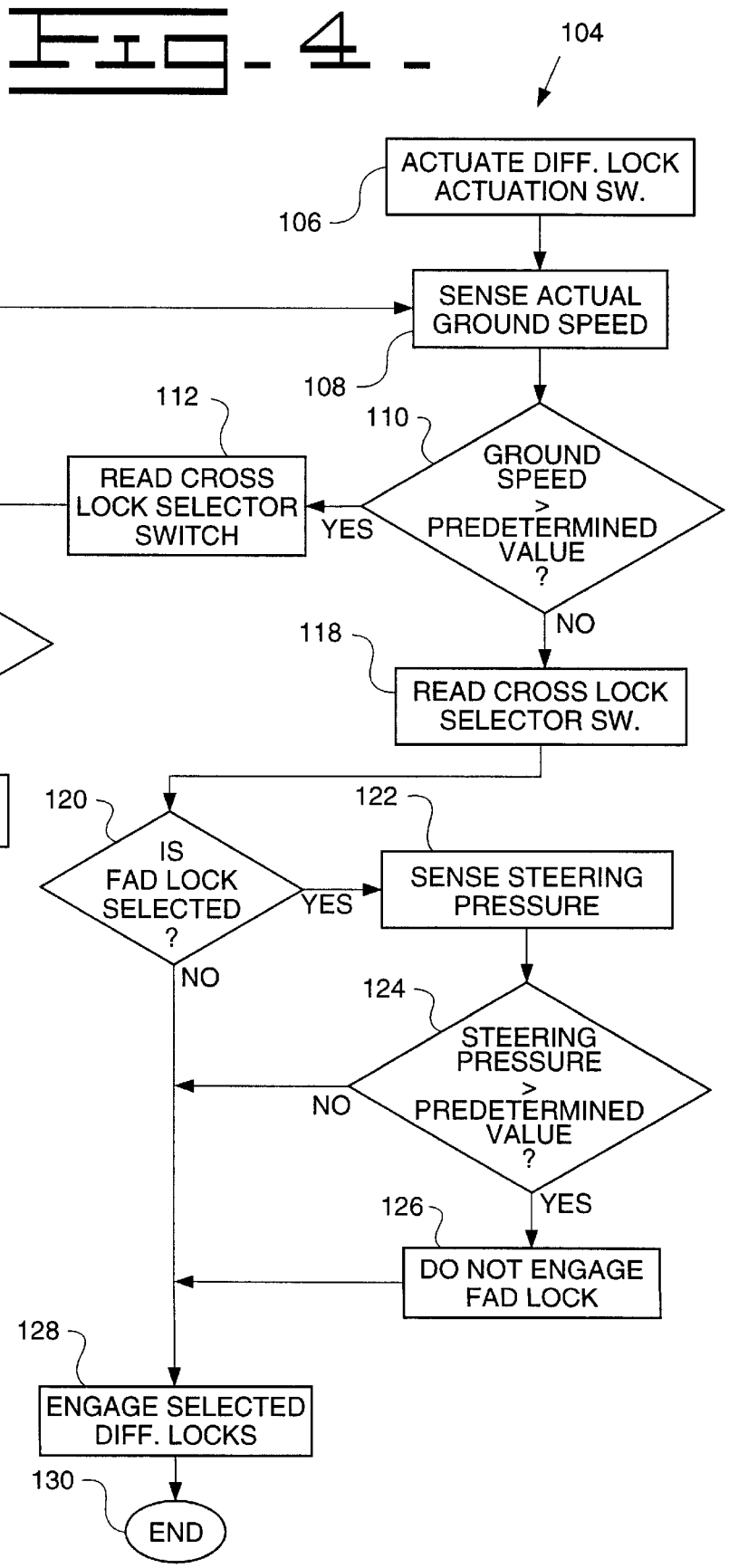

DIFFERENTIAL LOCK CONTROL SYSTEM

TECHNICAL FIELD

This invention relates generally to differential control systems used on a wide variety of work machines for traction control and, more particularly, to a differential lock control system which incorporates monitoring of the machine's ground speed and/or steering pressure into such system so that the system can be engaged or disengaged while the machine is moving without causing damage thereto, and which system allows the machine operator to select any number of different axle lock-up combinations depending upon the particular traction condition encountered in a particular work environment.

BACKGROUND ART

Work machines such as articulated dump trucks and motor graders often work in environments which give rise to poor traction conditions. As a result, articulated trucks and other types of work machines having two, three or any plurality of axles are typically equipped with some type of traction control device for locking up the respective axles of the machine as well as for locking up the drivelines between the tractor and trailer portions. Typical traction control devices include limited slip differentials or various types of lock-up clutches. These devices are used to send power from the transmission output shaft, through the final drive assemblies, to the wheels. The various types of differentials can be locked or unlocked depending upon the particular operating conditions. When one drive wheel has bad traction, that wheel will turn freely. This action causes a loss of power which can be eliminated by at least locking the differential associated with the particular axle involved. When locked, the differential transfers torque to all wheels under all traction conditions. When unlocked, the torque transferred to the wheels by the differential is limited by the wheel which has the least amount of traction. Limited slip differentials are usually automatically controlled while the lock-up clutches are usually controlled by the machine operator. Similarly, the differential lock-up between the front and rear axles are almost always controlled by the operator. The machine operator must choose both the time and the particular operating parameters under which to engage the lock-up system.

Depending upon the particular type of differentials being used as well as the lock-up system employed, lock-up of the axles cannot always be engaged or disengaged while the machine is moving (on the fly). On those systems where lock-up can be engaged on the fly, the operator has to be constantly aware of certain operating parameters such as the ground speed of the machine as most differential lock-up control systems are limited to engagement below certain speeds. If such systems are engaged above the limiting speed restriction applicable for the particular system being utilized, damage to the system will typically occur as thrust washers and other differential/lock-up components will either wear excessively or suffer immediate fatigue damage and/or failure. This is an undesirable condition.

Another problem associated with manually controlled differential lock systems is that often times, when the front axle differential lock is engaged, steering of the work machine may become difficult or hard depending upon the particular operating conditions encountered. This is particularly true when the front axle differential lock is engaged and the work machine is operating on hard ground. To overcome this situation, the operator must typically manually disengage the entire differential lock-up system. This is likewise an undesirable condition.

In addition, because the drive wheels associated with these types of work machines are differentially geared, when one wheel loses traction, its wheel speed increases and the differential system may experience an overspeed condition. This again is an undesirable condition.

It is therefore desirable to provide a differential lock control system which will automatically monitor both the work machine's ground speed as well as steering pressure and, based upon such inputted parameters, will controllably respond and either engage or disengage the differential lock system based upon such operating parameter.

Accordingly, the present invention is directed to overcoming one or more of the problems as set forth above.

DISCLOSURE OF THE INVENTION

In accordance with the teachings of the present invention, a differential lock control system is disclosed wherein a cross lock selector switch, a differential lock actuation switch, a ground speed sensor and a plurality of differential lock solenoids are all coupled to an electronic controller in a particular manner such that switch and sensor signals inputted to the controller will control engagement or disengagement of the specific differential locks selected. Based upon the signals inputted to the electronic controller, such controller will output appropriate signals to actuate the appropriate differential lock solenoids.

The cross lock selector switch is a multi-positionable switch located in the operator compartment which allows the operator to manually select a multitude of different axle lock-up combinations depending upon the particular traction conditions encountered during a work operation. These different axle lock-up combinations may include any combination of the front axle, center axle, rear axle and interaxle differentials as well as individual lock-up of any one of the differentials associated with any one of the respective axles, if appropriate. Once the cross lock selector switch has been manually positioned as indicated above by the machine operator, the differential lock actuation switch which is likewise located in the operator compartment must be engaged before any lock-up can occur. The electronic controller monitors the actuation of the differential lock actuation switch as well as the position of the cross lock selector switch to determine when the operator wants the differential lock system engaged. When the actuation switch is closed or energized, the electronic controller will likewise monitor the signal inputted from the ground speed sensor to ensure that the work machine is operating below a predetermined ground speed before engaging the requested lock-up combination. If the ground speed of the machine is above the predetermined speed, the electronic controller will not engage the lock-up system. In a similar fashion, the electronic controller will continuously monitor the ground speed of the work machine and if such ground speed approaches and/or exceeds the predetermined limiting ground speed, the electronic controller will automatically disengage the requested lock-up combination. In this event, re-engagement of any particular lock-up combination can be accomplished in accordance with any desired re-activation scheme such as by simply re-engaging the differential lock actuation switch when the ground speed of the work machine is within proper limits.

In another aspect of the present invention, a steering system pressure sensor may likewise be coupled to or with the electronic controller so that the controller can monitor a predetermined steering system pressure. In this particular situation, the steering system pressure sensor will directly control operation of the front differential lock system and if the electronic controller senses that the steering pressure is below a predetermined value, it will allow the front axle differential lock, if selected, to be engaged. Similarly, if the electronic controller senses that the steering pressure is approaching and/or exceeds the predetermined value, the electronic controller will automatically disengage the front axle differential lock so that steering will not be detrimentally hindered. In this particular scenario, only the front axle differential lock system will be disengaged. All of the other selected lock-up combinations will remain engaged and active. Here again, re-engagement of the front axle differential lock system can be accomplished in accordance with any desired operating scheme such as by allowing such front axle to again become engaged when the steering pressure drops below a predetermined value, or by having the operator re-engage the differential lock actuation switch. The re-engagement scheme based upon inputs from both the ground speed sensor as well as the steering pressure sensor may vary depending upon the particular type of work machine involved as well as the different sizes of such machines.

The present differential lock control system therefore allows an operator to confidently select engagement of the differential lock system while on the fly without fear of engaging the same above the limiting ground speed and without fear of hindering the steering maneuverability of the machine. The present differential lock control system can be incorporated into any work machine utilizing a traction control system in accordance with the teachings of the present invention.

BRIEF DESCRIPTION OF THE DRAWINGS

For a better understanding of the present invention, reference may be made to the accompanying drawings in which:

FIGS. 3A and 3B are flow charts of the operating steps for the differential lock control system of FIG. 2 constructed in accordance with the teachings of one embodiment of the present invention; and FIG. 4 is a flow chart of the operating steps for a differential lock control system constructed in accordance with the teachings of another embodiment of the present invention.

BEST MODE FOR CARRYING OUT THE INVENTION

Figure 1:
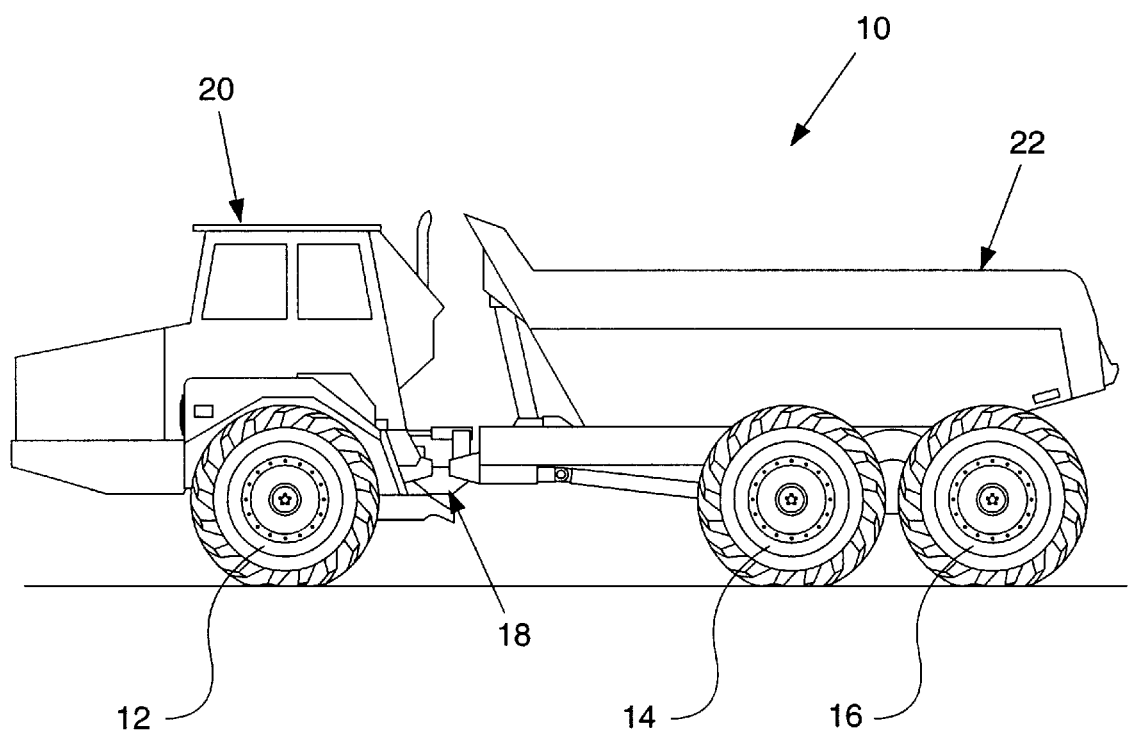
FIG. 1 is an illustration of a typical articulated truck utilizing the present differential lock control system.

Referring to FIG. 1, numeral 10 in FIG. 1 represents a typical work machine, in this case an articulated dump truck, having three separate and independent axles, namely, a front axle 12, a center axle 14 and a rear axle 16. Each of these respective axles 12, 14 and 16 includes a differential which is used to distribute power from the transmission output shaft, through the final drive systems, to the respective wheels of each axle. Each differential can be either locked or unlocked. When locked, each differential transfers torque to all wheels associated with a particular axle under all traction conditions. When a differential lock is engaged, the speed of the wheels associated with such axle is the same. This stops a loss of power by not allowing one wheel to turn freely. For turns, a differential can be unlocked to reduce the turning radius and tire wear. When one wheel is turning slower than the other, as in a turn, the differential lets the inside wheel stop or go slower in relationship to the outside wheel. In this situation, the differential still sends the same amount of torque to each wheel associated with a particular axle.

An interaxle differential 18 is likewise positioned between the drivelines associated with the tractor portion 20 and the trailer portion 22 of the articulated truck 10. The interaxle differential 18 divides torque proportionately between the tractor 20 and the trailer 22. Based upon the particular type of work machine such as, for example, a two axle machine versus a three or more axle machine, torque may be divided differently between the tractor and trailer portions. In a work machine having, for example, three axles, approximately 40% of such torque may be directed to the tractor or front axle 12 whereas approximately 60% may be directed to the transfer drive on the trailer. The transfer drive is connected to the differentials associated with the trailer axles 14 and 16. The 60/40 torque split can be achieved by making the output gears associated with the interaxle differential different sizes. In the case of a two axle machine, a 50/50 torque split may be desirable. Regardless of how the torque is divided between the tractor and trailer portions, the interaxle differential 18 can likewise be selectively locked when ground conditions are poor to lock both output shafts to the input shaft thereby allowing power to be transmitted equally to both output shafts so as to allow torque to go to the tractor or trailer side that has traction.

Figure 2:
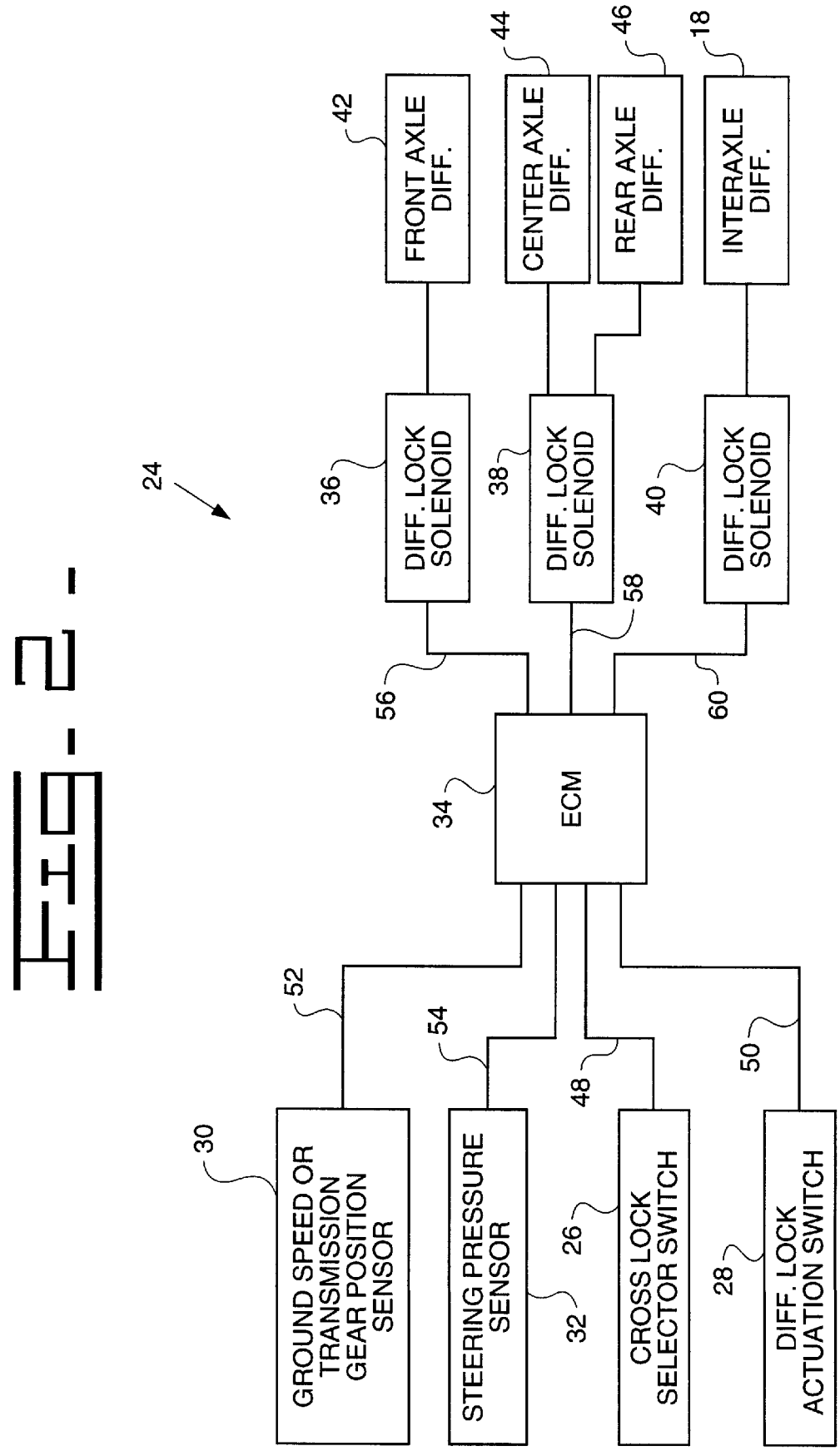
FIG. 2 is a schematic diagram of a differential lock control system constructed in accordance with the teachings of one embodiment of the present invention.

Selectively locking each of the differentials associated with the front axle 12, the center axle 14, the rear axle 16 and the interaxle 18 is typically accomplished through the use of electrically operated solenoid valves such as the solenoids 36, 38 and 40 illustrated in FIG. 2. Actuation of the differential lock actuation or control switch 28 (FIG. 2) typically controls a solenoid activated hydraulic valve located on each of the respective differential carriers such as the solenoid valves 36, 38 and 40 illustrated in FIG. 2. These solenoids are used in a conventional manner to control fluid flow to the respective differentials to either lock or unlock the same as will be hereinafter further explained.

Referring to FIG. 2, numeral 24 in FIG. 2 represents one embodiment of the differential lock control system of the present invention. The differential lock control system 24 includes a cross lock selector switch 26, a differential lock actuation switch 28, a ground speed sensor 30 and a steering pressure sensor 32, all of which switches and sensors provide signal inputs to the electronic control module (ECM) 34. Based upon the input signals from switches 26 and 28 as well as input signals from sensors 30 and 32, ECM 34 will control output signals to the various differential lock solenoid valves 36, 38 and 40. These solenoid valves are used in a conventional manner to control fluid flow to the respective differentials associated with machine axles 12, 14 and 16 as well as the interaxle differential 18, the differential lock solenoid 36 controlling fluid flow to and the operation of the front axle differential 42, the differential lock solenoid 38 controlling fluid flow to and the operation of both the center axle differential 44 and the rear axle differential 46, and the differential lock solenoid 40 controlling fluid flow to and the operation of the interaxle differential 18.

Electronic controllers or modules such as ECM 34 are commonly used in association with work machines for controlling and accomplishing various functions and tasks including locking and unlocking the differentials associated with a particular machine. In this regard, ECM 34 will typically include processing means, such as a microcontroller or microprocessor, associated electronic circuitry such as input/output circuitry, analog circuits or programmed logic arrays, as well as associated memory. ECM 34 can therefore be programmed to sense and recognize appropriate signals from input devices 26, 28, 30 and/or 32 indicative of certain conditions or parameters as will be hereinafter explained, and thereafter provide appropriate output signals to accomplish certain tasks such as controlling operation of the differential lock solenoids 36, 38 and 40.

The cross lock selector switch 26 is a multi-positionable switch located in the operator compartment which allows the operator to manually select a plurality of different axle lock-up combinations depending upon the particular environmental conditions encountered. For example, selector switch 26 may include any of the following possible differential lock-up combinations:

1. IAD only
2. FAD only
3. IAD+FAD
4. CAD+RAD
5. FAD+CAD+RAD
6. IAD+CAD+RAD
7. IAD+FAD+CAD+RAD where
IAD=interaxle differential
FAD=front axle differential
CAD=center axle differential
RAD=rear axle differential.

Any or all of the above-identified selector switch 26 combinations may be utilized in association with a particular work machine depending upon the size, capabilities and work environment encountered by that particular machine. It is also possible to have an off position associated with cross lock selector switch 26 wherein no differential lock-up condition is selected, or where the off position automatically selects a particular differential lock-up condition such as the lock-up of the interaxle differential only. It is also recognized and anticipated that a wide variety of other switch positions as well as other differential lock-up combinations are possible without departing from the spirit and scope of the present invention.

Selector switch 26 should be conveniently mounted or located within the operator compartment for easy access by the operator and switch 26 is coupled to or with ECM 34 via conductive path 48. As such, ECM 48 will continuously monitor and sense the position of switch 26 with respect to any one of the above-identified differential lock-up combinations. A signal indicative of the position of selector switch 26 is therefore continuously inputted via conductive path 48 to ECM 34.

Differential lock actuation switch 28 is provided to affect actuation of the differential lock combination selected by selector switch 26. Switch 28 is likewise located in the operator compartment and it typically takes the form of a foot pedal or switch located on the floor of the operator compartment. In this regard, it is recognized that actuation switch 28 can be located anywhere in the operator compartment so as to be easily accessible by the machine operator. Actuation switch 28 is coupled to or with ECM 34 via conductive path 50 and is normally a momentary switch requiring the operator to keep the switch engaged or depressed in order to enable and actuate the requested differential lock-up combinations as selected by selector switch 26. If switch 28 is a momentary switch, it will remain closed for as long as such switch is held by the operator in its engaged or depressed state, and switch 28 will return to its open state upon release by the operator. When switch 28 is released, the requested differential lock-up combination selected by switch 26 is not engaged, and the operation of all of the various differentials such as the differentials 18, 42, 44 and 46 will be normal.

Actuation of the differential lock actuation switch 28 will input a signal to ECM 34 and, based upon such input and the position of selector switch 26, ECM 34 will output signal(s) to the appropriate differential lock solenoids such as the solenoids 36, 38 and 40 via conductive paths 56, 58 and 60 to lock-up the appropriate axle differentials if certain additional parameters are satisfied as will be hereinafter explained. In addition, although actuation switch 28 has been described in the context of being a momentary switch, it is also recognized and anticipated that switch 28 can likewise be an on/off switch, or such switch can take on any other switch configuration without departing from the spirit and scope of the present invention.

A ground speed sensor 30 is likewise coupled to ECM 34 via conductive path 52 for constantly delivering ground speed indicative signals to ECM 34 during the operation of the particular work machine. The ground speed sensor 30 continuously senses and monitors the particular ground speed of the work machine and provides such information to ECM 34 for the reasons hereinafter explained. Ground speed sensor 30 could, for example, take the form of a radar unit properly positioned on the work machine, the use of which is well known in the art. Use of a radar unit to measure ground speed is advantageous in that it gives a true indication of ground speed that is independent of wheel slip and other parameters. While the use of a radar unit as the ground speed sensor is preferred, other sensors are likewise well known in the art and could likewise be utilized to determine the ground speed of the particular work machine.

Although the present differential lock control system can be engaged on the fly, depending upon the particular type of differentials being utilized as well as the particular work environment and work applications associated with a particular work machine, there is typically a limiting maximum ground speed above which actuation or engagement of the various differential locks may cause damage to or failure of the overall system. For example, in association with work machines such as articulated dump trucks or motor graders, damage to the differential lock system may occur under certain conditions if the differential lock system is engaged on the fly at speeds above 10 mph to 20 mph. At these speeds, wheel slippage will typically not occur and use of the differential lock system above such limiting speed is usually not necessary. Nevertheless, regardless of the particular maximum ground speed determined for engagement of a particular differential lock system for a particular work machine, ECM 34 can be programmed so as to not allow enablement or engagement of the selected differential lock combination when actuation switch 28 is actuated and the ground speed sensed by sensor 30 is above the selected predetermined value. Similarly, ECM 34 can be programmed to disengage the selected differential lock-up combination if ECM 34 receives a signal inputted from sensor 30 indicating that the ground speed of the particular work machine is either approaching the selected predetermined ground speed and is within some predetermined range relative thereto, or such ground speed is either equal to or has exceeded the predetermined ground speed value. ECM 34 will therefore continuously and automatically monitor the ground speed of the particular work machine and will either allow or disallow actuation of the selected differential lock-up combinations based upon the signal input from sensor 30. This is particularly advantageous because it eliminates unnecessary wear and tear on the various components of the differential lock control system and it likewise avoids premature component failure. In addition, the present system obviates the need for the machine operator to constantly monitor the ground speed of the machine before requesting the actuation of the differential lock control system.

Depending upon the programming of ECM 34, if ECM 34 disengages the selected differential lock-up combination requested by the operator based upon exceeding the maximum predetermined ground speed, the present differential lock control system will allow re-engagement of the system under a wide variety of controlled conditions. For example, ECM 34 can be programmed to allow re-engagement of the differential lock control system as soon as the machine ground speed drops below the maximum predetermined value so long as switch 28 remains engaged; or ECM 34 may be programmed to allow re-engagement of the differential lock control system when the ground speed of the work machine drops to a speed which is a couple of miles per hour, or some other predetermined speed range, below the maximum predetermined ground speed. Still further, ECM 34 may be programmed such that once the selected differential lock-up combination is disengaged for exceeding the maximum ground speed limit, the operator may be required to de-activate switch 28 and thereafter re-engage or re-actuate such switch within an acceptable predetermined ground speed range below the maximum limit before re-engagement of the differential lock control system will be allowed. It is recognized and anticipated that a wide variety of other re-engagement conditions and scenarios may be programmed into ECM 34 without departing from the spirit and scope of the present invention.

Sensor 30 may also take the form of a transmission gear position sensor which would constantly monitor and sense the particular forward or reverse gear in which the work machine is operating at any particular point in time. This sensor could be used in lieu of a ground speed sensor and would likewise be coupled to or with ECM 34 via conductive path 52. In this particular situation, sensor 30 would be providing a signal to ECM 34 indicative of the particular transmission gear in which the machine is presently operating, the particular operating gear being indicative of the ground speed of the work machine. For example, based upon the particular work machine involved, ECM 34 could be programmed so as to not allow engagement of the differential control lock system if the operator is operating the work machine in, for example, third gear or higher when moving in the forward direction, and second gear or higher when moving in the reverse direction. The particular predetermined forward and reverse gears would be selected based upon the known speeds achieved by the particular work machine when operating in any one of the particular forward and reverse gears, or some other speed correlated criteria. For example, a particular work machine may not normally be operated in its third forward gear unless such machine is operating at a forward ground speed in excess of 10 mph to 15 mph. Similarly, a speed correlation can likewise be established for the reverse gears. As such, a particular forward and a particular reverse gear can then be selected as corresponding to a maximum ground speed limitation for engagement and disengagement of the present differential lock control system. Such transmission gear position sensors are well known in the art and therefore a detailed description of such sensors is not included herein.

Similar to use of a ground speed sensor, ECM 34 can likewise be programmed to engage and/or disengage the selected differential lock-up combination based upon signal inputs received from the transmission gear position sensor 30 and re-engagement of the differential lock system can likewise be accomplished in a manner similar to that described above with respect to ground speed sensor 30.

ECM 34 may likewise be coupled to or with a steering pressure sensor 32 via conductive path 54 for receiving a signal indicative of the steering pressure or steering effort being exerted by the operator in order to steer the particular work machine. Typically, under certain operating conditions, locking up the front axle differential 42 may result in making the work machine particularly hard to steer. The sensor 32 may be located in the lines to the steering cylinders, or such sensor may otherwise be coupled to the steering system, so as to sense and monitor when a predetermined steering effort is being required in order to steer the machine. This steering effort or pressure is inputted to ECM 34 via conductive path 54 and ECM 34 may be programmed so that if the front axle differential is lock up and the predetermined steering pressure is approached or exceeded, ECM 34 will unlock or disengage the front axle differential to allow easier steering of the work machine. Here again, ECM 34 may be programmed to unlock the front axle differential, if locked, when either the predetermined steering pressure is exceeded, or such predetermined value is approached within some predetermined range. Similarly, re-engagement of the front axle differential lock can be accomplished under predetermined conditions similar to the multitude of possibilities discussed above with respect to ground speed sensor 30 when the steering effort has been reduced below a predetermined or desired level. ECM 34 will only engage or disengage lock-up of the front axle differential based upon signal inputs received from steering sensor 32, and only if the lock-up of the front axle differential has been selected or requested through the positioning of selector switch 26. Other selected differential lock combinations will not be affected by steering sensor 32.

The present differential lock control system 24 therefore enables an operator to select the particular differential lock-up combinations desired based upon operating or environmental conditions and thereafter the operator requests ECM 34 to engage the selected lock-up combinations by actuating the differential lock actuation switch 28. ECM 34 will then actuate the requested differential lock-up combinations if the additional parameters established by sensors 30 and/or 32 are satisfied. In this regard, it is recognized and anticipated that the sensors 30 and 32 can be incorporated into the present system either individually or in combination as discussed above.

INDUSTRIAL APPLICABILITY

As described herein, the present differential lock control system 24 has particular utility in certain types of work machines such as articulated dump trucks, motor graders, and other types of work machines having multiple axles which are typically equipped with some type of traction control device for both locking up the various axles and the drivelines associated with such machines for all of the reasons set forth and explained above.

Figure 3A:
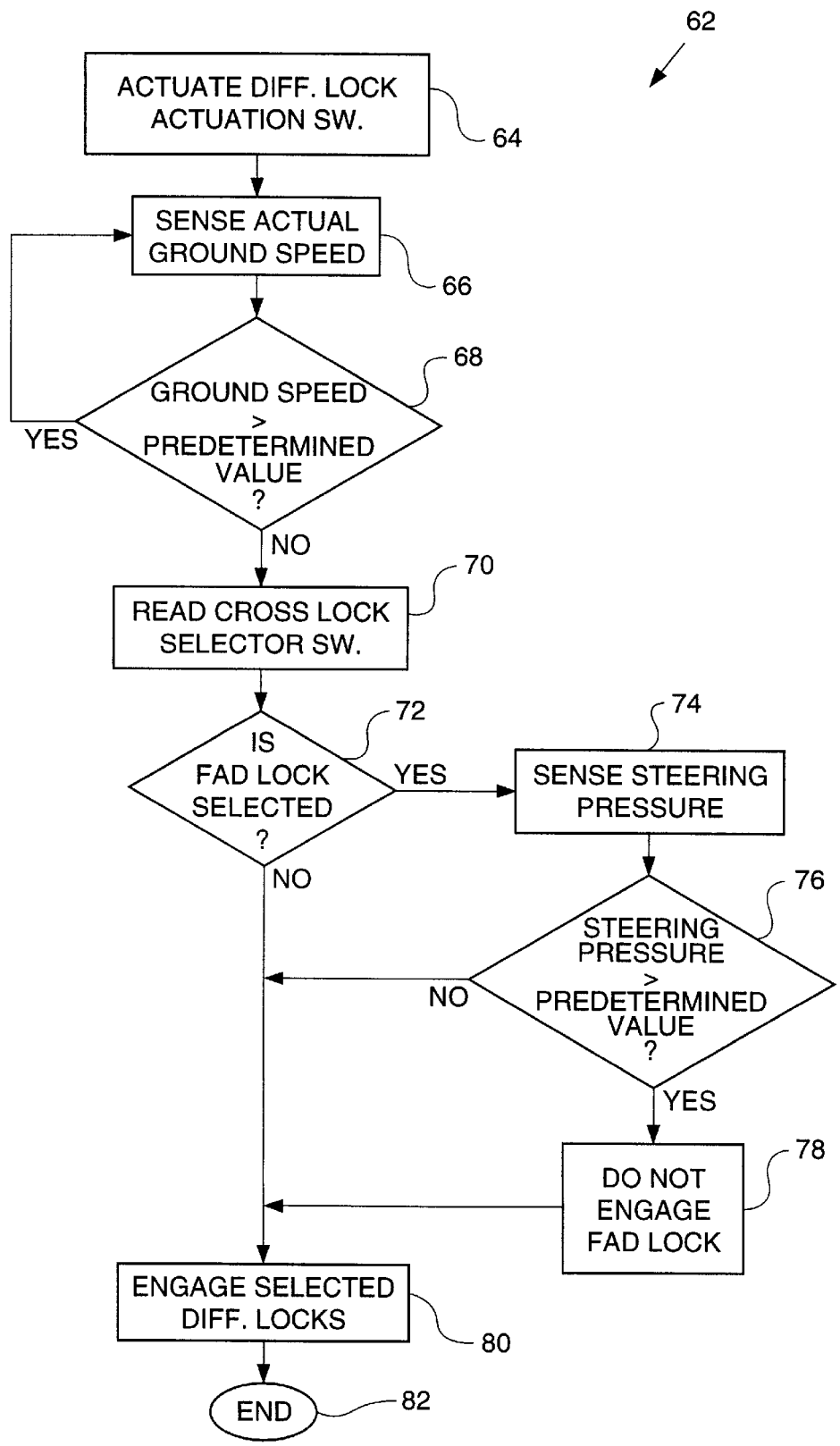

An example of operation in accordance with one aspect of the present invention is set forth in the flow charts illustrated in FIGS. 3A and 3B, and an example of operation in accordance with another embodiment of the present invention is illustrated in FIG. 4. The operating steps as set forth in control loops 62, 84 and 104 can be incorporated into the programming of the processing means of ECM 34 by techniques well known to those of ordinary skill in the art. The operating steps of flow charts 62, 84 and 104 are initiated and operable after power has been applied to ECM 34 and such steps can be repeated at any predetermined rate or interval.

Referring to FIG. 3A, once control loop 62 is initiated, ECM 34, at step 64, will look to see if the differential lock actuation switch 28 has been actuated. If switch 28 has been actuated by the operator thereby requesting engagement of certain selected differential lock-up combinations, ECM 34 will then sense the actual ground speed of the work machine at step 66 via the signal input from ground speed sensor 30. At step 68, ECM 34 will compare the actual ground speed of the machine to a predetermined ground speed and if such speed is greater than the predetermined speed, ECM 34 will continue to monitor and sense the actual ground speed inputted by sensor 30 at step 66 until such speed is less than the predetermined value selected for that particular machine. It is also recognized and anticipated that ECM 34 could be programmed so as to terminate control loop 62 at step 68 if the actual ground speed sensed by sensor 30 is greater than the predetermined selected value. Other programming and logic alternatives can be inputted at step 68 based upon the comparison of actual ground speed with the selected predetermined ground speed without departing from the spirit and scope of the present invention.

If, on the other hand, at step 68, the actual ground speed of the machine is less than the selected predetermined value, ECM 34 will next read the position of the cross lock selector switch 26 inputted via conductive path 48 to determine which of the various axle lock-up combinations have been selected by the operator. These combinations could be any one of the above-discussed combinations including other combinations as well. At step 72, ECM 34 will determine if the front axle differential has been selected by the operator to be locked based upon the position of selector switch 26. If the front axle differential has not been selected for lock-up, ECM 34 will skip to step 80 and engage all of the selected differential lock-up combinations in accordance with the position of selector switch 26. This engagement of the selected differential locks is accomplished by ECM 34 outputting appropriate signals to the appropriate differential lock solenoids via conductive paths 56, 58 and/or 60. Control loop 62 may then terminate at step 82.

If, on the other hand, the front axle differential has been selected at step 72 to be locked in accordance with the position of selector switch 26, ECM 34 will then read the steering pressure inputted by steering sensor 32 at step 74 and will thereafter compare the current steering pressure with a predetermined steering pressure or steering effort value at step 76. If it is determined that the steering pressure is less than the predetermined selected value, ECM 34 will again engage all of the selected differential lock-up combinations including lock-up of the front axle differential at step 80. Control loop 62 may then again terminate at step 82.

On the other hand, if ECM 34 determines, at step 76, that the steering pressure inputted via sensor 32 is greater than the predetermined selected value, then ECM 34 will not output a signal to lock-up the front axle differential at step 78 and will not energize the front axle differential lock solenoid 36 via conductive path 56. ECM 34 will then proceed to step 80 and engage all of the selected differential lock combinations except the front axle differential lock. Again, control loop 62 may then terminate at step 82.

Since sensors 30 and 32 operate independent of each other, such sensors can be individually and separately incorporated into the present control system. For example, sensor 32 may be offered as an optional feature with a particular work machine and if such feature was not selected, operating steps 72, 74, 76 and 78 could be eliminated from flow chart 62 and step 80 would follow directly from step 70. In similar fashion, if sensor 30 was not selected as part of the preferred system, operating steps 66 and 68 could be eliminated from flow chart 62 and step 70 would follow directly from step 64.

Once control loop 62 has completed a particular cycle, this process can be repeated each time differential lock actuation switch 28 is actuated, or such process can be repeated based upon a predetermined repeat interval. Still further, ECM 34 can be further programmed to constantly monitor the signal inputs from sensors 30 and/or 32 so as to disengage and/or re-engage the selected lock-up combinations based upon the ground speed and steering pressure values inputted to ECM 34 during continuous operation of the work machine once the present differential lock control system has been activated or engaged. In this regard, control loop 84 illustrated in FIG. 3B represents one series of operating steps which could be utilized to continuously monitor the signal inputs from both sensors 30 and 32. Referring to FIG. 3B, control loop 84 would be inserted after step 80 of control loop 62 and, at step 86, ECM 34 would continue to monitor and sense the ground speed inputted thereto via sensor 30. Like step 68, step 88 of control loop 84 would compare the actual ground speed of the work machine determined at step 86 with the predetermined selected value and if such ground speed is greater than the predetermined value, ECM 34 would disengage all of the selected differential lock combinations requested by selector switch 26 at step 90. Control loop 84 could then be programmed to either loop back to step 68 of control loop 62, or terminate as illustrated in step 92.

If, on the other hand, at step 88 (FIG. 3B), ECM 34 determines that the ground speed is less than the selected predetermined value, ECM 34 will then again determine, at step 94, if the front axle differential has been selected by the operator to be locked via the position of the selector switch 26. If the front axle differential has not been selected for lock-up, ECM 34 will loop back to step 86 and repeat control loop 84. If, on the other hand, at step 94, ECM 34 determines that the operator has selected lockup of the front axle differential, ECM 34 will then sense the current steering pressure or steering effort at step 96 and will thereafter compare such steering pressure with a predetermined value at step 98. If the steering pressure sensed by ECM 34 via sensor 32 is less than the selected predetermined value, ECM 34 will again loop back to step 86 and control loop 84 will again be repeated. On the other hand, if the steering pressure at step 96 is greater than the selected predetermined value at step 98, ECM 34 will disengage the locking of the front axle differential at step 100. ECM 34 can then be programmed to either loop back to step 72 of control loop 62 or terminate as illustrated in step 102. It is recognized and anticipated that other routines and/or control loops other than control loop 84 can be utilized in order to continuously monitor the signal inputs from sensors 30 and 32 so as to either energize or de-energize any of the various differential lock solenoids 36, 38 and 40 based upon the actual ground speed and/or steering pressure values inputted to ECM 34 and based upon a comparison of those actual values with the selected predetermined values as described above.

Under certain operating conditions, it may be desirable to lock-up the interaxle differential 18 regardless of the ground speed of the work machine. For example, in order to retard the forward speed of a particular work machine when it is operating downhill on a particular grade, it is sometimes useful to lock-up the interaxle differential and use the same as a braking system to help control the forward speed of the machine. On some types of work machines, a retarder system is likewise provided for engagement along with locking up the interaxle differential to further aid in controlling the forward speed of the machine when working on an inclined surface. In this particular situation, ECM 34 can be programmed such that if the interaxle differential 18 is one of the differentials selected via selector switch 26, ECM 34 will engage the interaxle differential lock regardless of the ground speed being inputted to ECM 34 from the ground speed sensor 30. In this regard, flow chart 104 illustrated in FIG. 4 represents one series of operating steps which could be utilized to allow lock-up of the interaxle differential 18 regardless of the ground speed of the work machine.

Referring to FIG. 4, once the differential lock actuation switch 28 has been actuated and sensed by ECM 34 at step 106, ECM 34 will sense the actual ground speed of the work machine at step 108 via the signal input from ground speed sensor 30. At step 110, ECM 34 will again compare the actual ground speed of the machine to a predetermined ground speed and if such speed is greater than the predetermined speed, ECM 34 will then read the position of the cross lock selector switch 26 at step 112 and will determine if the interaxle differential has been selected by the operator to be locked at step 114. If the interaxle differential has not been selected for lock-up, ECM 34 will loop back to step 108 and continue to monitor and sense the actual ground speed inputted by sensor 30 until such speed is less than the predetermined value selected for that particular machine at step 110. If, on the other hand, at step 114, the interaxle differential has been selected to be locked in accordance with the position of the selector switch 26, ECM 34 will then output the appropriate signal to engage the interaxle differential lock at step 116 and will thereafter loop back to step 108 to again monitor and sense the actual ground speed of the machine at step 108 for comparison with the predetermined speed value at step 110. At this particular point in time, only interaxle differential 18 is locked up and any other selected differential lock-up combinations will not be allowed until the ground speed of the work machine is less than the predetermined value selected for that particular machine at step 110.

If, at step 110, the actual ground speed of the machine is less than the selected predetermined value, ECM 34 will again read the position of the cross lock selector switch 26 at step 118 to determine which of the other various axle lock-up combinations have been selected by the operator. Operating steps 120 through 128 as indicated in control loop 104 of FIG. 4 are substantially identical to the operating steps 72 through 80 previously discussed with respect to control loop 62 of FIG. 3A. If the front axle differential has not been selected for lock-up, ECM 34 will lock-up all of the remaining selected differentials at step 128 and control loop 104 will terminate at step 130. If, on the other hand, the front axle differential has been selected at step 120, lock-up of the front axle differential will be based upon the steering pressure comparison made at step 124 as previously explained with respect to control loop 62.

With respect to the programming or logic configuration explained above with respect to control loop 104 (FIG. 4), ECM 34 can likewise be further programmed to constantly monitor the signal inputs from sensors 30 and/or 32 so as to disengage and/or re-engage the selected lock-up combinations, except for the interaxle differential, based upon the ground speed and steering pressure values inputted to ECM 34 during continuous operation of the work machine once the selected differentials have been locked up at step 128. In this regard, the operating steps set forth in control loop 84 (FIG. 3B) could again be utilized except that step 90 would be changed such that ECM 34 would disengage all selected differential locks except for the interaxle differential. All of the remaining operating steps of control loop 84 would remain unchanged and would likewise apply to the programming set forth in control loop 104. In this particular situation, the interaxle differential would remain locked up regardless of the ground speed of the work machine until the differential lock actuation switch 28 is released or deactivated by the operator. It is likewise recognized and anticipated that other programming and logic alternatives could be utilized to lock-up the interaxle differential 18, when desired, regardless of the ground speed of the machine without departing from the spirit and scope of the present invention.

It is also recognized that variations to the operating steps depicted in flow charts 62, 84 and 104 could likewise be made without departing from the spirit and scope of the present invention. In particular, steps could be added or some steps could be eliminated. All such variations are intended to be covered by the present invention. Still further, it is also recognized that in most applications a differential lock control system including ECM 34 will include a variety of other components such as other switches, solenoids, relays, indicators, sensors and other control apparatus.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A control system for controlling at least one differential assembly associated with a work machine wherein the work machine includes a drive transmission system, a plurality of axles having wheels associated respectively therewith, a differential assembly associated with at least one of the axles and coupled with the transmission system for turning the wheels associated with the at least one axle, each of the differential assemblies having a locking mechanism operable between an unlocked condition wherein wheel turning is unaffected and such wheels turn differentially and a locked condition wherein wheel turning is affected and such wheels turn at the same speed, said control system comprising:

a first switch positionable to select at least one of the differential assemblies for operation in its locked condition, said first switch outputting a signal indicative of the differential assemblies selected for operation in their locked condition;

a second switch actuatable to control the locking of the differential assemblies selected by the positioning of the said first switch, said second switch being actuatable between a first state corresponding to the condition when an operator is not requesting actuation of the locking mechanisms associated with the selected differential assemblies and a second state corresponding to the condition when an operator is requesting actuation of the locking mechanisms associated with the selected differential assemblies;

a ground speed sensor for determining the ground speed of the work machine; and an electronic controller coupled with said first and second switches and with said ground speed sensor for receiving signals therefrom, said controller being operable to receive a signal from said first switch indicative of which differential assemblies have been selected for operation in their locked condition, a signal indicative of when said second switch is in its first or second state, and a signal indicative of the ground speed of the work machine;

said controller outputting a signal to actuate the locking mechanism of the selected differential assemblies when said controller receives a signal from said first switch indicative of which differential assemblies have been selected for operation in their locked condition, a signal indicative of said second switch being in its second state, and a signal indicative of the ground speed of the work machine being below a predetermined ground speed.

2. The control system, as set forth in claim 1, wherein the plurality of axles of the work machine includes a front, center and rear axle and an interaxle connecting the drivelines between the front axle and the center and rear axles, and wherein the work machine includes a differential assembly associated with each of said front, center and rear axles and said interaxle, said first switch being positionable to select the locked condition of the interaxle differential only, and said first switch being further positionable to select the locked condition of all of the respective differentials including the front axle differential, the center axle differential, the rear axle differential, and the interaxle differential.

3. The control system, as set forth in claim 2, wherein said first switch is further positionable to select the locked condition of the front axle differential only, the locked condition of both the front axle and interaxle differentials, the locked condition of both the center axle and rear axle differentials, the locked condition of the center axle, rear axle and interaxle differentials, and the locked condition of the front axle, center axle and rear axle differentials.

4. The control system, as set forth in claim 1, wherein said controller outputs a signal to disengage the respective locking mechanisms of the differential assemblies selected by the positioning of said first switch when said controller receives a signal indicative of the ground speed of the work machine exceeding said predetermined ground speed.

5. The control system, as set forth in claim 1, wherein said controller outputs a signal to disengage the respective locking mechanisms of the differential assemblies selected by the positioning of said first switch when said controller receives a signal indicative of the ground speed of the work machine equaling said predetermined ground speed.

6. The control system, as set forth in claim 1, wherein said controller outputs a signal to disengage the respective locking mechanisms of the differential assemblies selected by the positioning of said first switch when said controller receives a signal indicative of the ground speed of the work machine approaching said predetermined ground speed and being within a predetermined range relative thereto.

7. The control system, as set forth in claim 1, wherein said second switch is a momentary switch.

8. The control system, as set forth in claim 1, wherein each of the differential assemblies includes at least one solenoid for controlling the locking operation thereof, said controller outputting a signal to the solenoids associated with the differential assemblies selected by the positioning of said first switch to affect the locking thereof.

9. The control system, as set forth in claim 1, including a steering pressure sensor for determining the steering effort required to turn the wheels associated with the front axle, said controller being coupled with said steering sensor for receiving signals therefrom indicative of the steering effort being exerted by an operator in order to steer the work machine, said controller outputting a signal to actuate the locking mechanism of the front axle differential when said controller receives a signal from said first switch indicative of the front axle differential having been selected for operation in its locked condition, and a signal indicative of the steering effort being below a predetermined amount.

10. The control system, as set forth in claim 9, wherein said controller outputs a signal to disengage the locking mechanism of the front axle differential when said controller receives a signal indicative of the steering effort exceeding said predetermined amount.

11. The control system, as set forth in claim 9, wherein said controller outputs a signal to disengage the locking mechanism of the front axle differential when said controller receives a signal indicative of the steering effort equaling said predetermined amount.

12. The control system, as set forth in claim 9, wherein said controller outputs a signal to disengage the locking mechanism of the front axle differential when said controller receives a signal indicative of the steering effort approaching said predetermined amount and being within a predetermined range relative thereto.

13. The control system, as set forth in claim 4, wherein said controller outputs a signal to re-actuate the locking mechanism of the selected differential assemblies when said controller receives a signal indicative of said second switch being in its second state, and a signal indicative of the ground speed of the work machine being below said predetermined ground speed.

14. The control system, as set forth in claim 10, wherein said controller outputs a signal to re-actuate the locking mechanism of the front axle differential when said controller receives a signal indicative of said second switch being in its second state, and a signal indicative of the steering effort being below said predetermined amount.

15. A control system for controlling at least one differential assembly associated with a work machine wherein the work machine includes a drive transmission system, a plurality of axles having wheels associated respectively therewith, a differential assembly associated with at least one of the axles and coupled with the transmission system for turning the wheels associated with the at least one axle, each of the differential assemblies having a locking mechanism operable between an unlocked condition wherein wheel turning is unaffected and such wheels turn differentially and a locked condition wherein wheel turning is affected and such wheels turn at the same speed, said control system comprising:

a first switch positionable to select at least one of the differential assemblies for operation in its locked condition, said first switch outputting a signal indicative of the differential assemblies selected for operation in their locked condition;

a second switch actuatable to control the locking of the differential assemblies selected by the positioning of the said first switch, said second switch being actuatable between a first state corresponding to the condition when an operator is not requesting actuation of the locking mechanisms associated with the selected differential assemblies and a second state corresponding to the condition when an operator is requesting actuation of the locking mechanisms associated with the selected differential assemblies;

a transmission gear position sensor for determining the particular transmission gear in which the work machine is operating; and an electronic controller coupled with said first and second switches and with said transmission gear position sensor for receiving signals therefrom, said controller being operable to receive a signal from said first switch indicative of which differential assemblies have been selected for operation in their locked condition, a signal indicative of when said second switch is in its first or second state, and a signal indicative of which transmission gear the work machine is operating in;

said controller outputting a signal to actuate the locking mechanism of the selected differential assemblies when said controller receives a signal from said first switch indicative of which differential assemblies have been selected for operation in their locked condition, a signal indicative of said second switch being in its second state, and a signal indicative of the transmission gear in which the work machine is operating being below a predetermined gear.

16. The control system, as set forth in claim 15, wherein said controller outputs a signal to disengage the respective locking mechanisms of the differential assemblies selected by the positioning of said first switch when said controller receives a signal indicative of the transmission gear in which the work machine is operating being equal to said predetermined gear.

17. A control system for controlling the front axle differential assembly associated with a work machine wherein the work machine includes a drive transmission system, a plurality of axles having wheels associated respectively therewith including a front axle, a differential assembly associated with at least the front axle and coupled with the transmission system for turning the wheels associated with the front axle, each of the differential assemblies having a locking mechanism operable between an unlocked condition wherein wheel turning is unaffected and such wheels turn differentially and a locked condition wherein wheel turning is affected and such wheels turn at the same speed, said control system comprising:

a first switch positionable to select at least the front axle differential assembly for operation in its locked condition, said first switch outputting a signal indicative of the differential assemblies selected for operation in their locked condition;

a second switch actuatable to control the locking of the differential assemblies selected by the positioning of the said first switch, said second switch being actuatable between a first state corresponding to the condition when an operator is not requesting actuation of the locking mechanisms associated with the selected differential assemblies and a second state corresponding to the condition when an operator is requesting actuation of the locking mechanisms associated with the selected differential assemblies;

a steering pressure sensor for determining the steering effort required to turn the wheels associated with the front axle; and an electronic controller coupled with said first and second switches and with said steering sensor for receiving signals therefrom, said controller being operable to receive a signal from said first switch indicative of which differential assemblies have been selected for operation in their locked condition, a signal indicative of when said second switch is in its first or second state, and a signal indicative of the steering effort being exerted by an operator in order to steer the work machine;

said controller outputting a signal to actuate the locking mechanism of the front differential assembly when said controller receives a signal from said first switch indicative of said front axle differential assembly having been selected for operation in its locked condition, a signal indicative of said second switch being in its second state, and a signal indicative of the steering effort being below a predetermined amount.

18. The control system, as set forth in claim 17, wherein said controller outputs a signal to disengage the locking mechanism of the front axle differential when said controller receives a signal indicative of the steering effort exceeding said predetermined amount.

19. A control system for controlling at least one differential assembly associated with a work machine wherein the work machine includes a drive transmission system, a plurality of axles having wheels associated respectively therewith including a front axle, an interaxle, a differential assembly associated with at least some of the axles including the front axle for turning the wheels associated with at least some of the axles, each of the differential assemblies having a locking mechanism operable between an unlocked condition wherein wheel turning is unaffected and such wheels turn differentially and a locked condition wherein wheel turning is affected and such wheels turn at the same speed, said control system comprising:

a first switch positionable to select at least one of the differential assemblies for operation in its locked condition, said first switch outputting a signal indicative of the differential assemblies selected for operation in their locked condition;

a second switch actuatable to control the locking of the differential assemblies selected by the positioning of the said first switch, said second switch being actuatable between a first state corresponding to the condition when an operator is not requesting actuation of the locking mechanisms associated with the selected differential assemblies and a second state corresponding to the condition when an operator is requesting actuation of the locking mechanisms associated with the selected differential assemblies;

a ground speed sensor for determining the ground speed of the work machine;

a steering pressure sensor for determining the steering effort required to turn the wheels associated with the front axle; and an electronic controller coupled with said first and second switches and with said ground speed sensor and said steering sensor for receiving signals therefrom, said controller being operable to receive a signal from said first switch indicative of which differential assemblies have been selected for operation in their locked condition, a signal indicative of when said second switch is in its first or second state, a signal indicative of the ground speed of the work machine, and a signal indicative of the steering effort being exerted by an operator in order to steer the work machine;

said controller outputting a signal to actuate the locking mechanism of the selected differential assemblies except for the front axle differential assembly when said controller receives a signal from said first switch indicative of which differential assemblies have been selected for operation in their locked condition, a signal indicative of said second switch being in its second state, and a signal indicative of the ground speed of the work machine being below a predetermined ground speed; and said controller outputting a signal to actuate the locking mechanism of the front axle differential when said controller receives a signal from said first switch indicative of the front axle differential having been selected for operation in its locked condition, a signal indicative of said second switch being in its second state, a signal indicative of the ground speed of the work machine being below a predetermined ground speed, and a signal indicative of the steering effort being below a predetermined amount.

20. The control system, as set forth in claim 19, wherein said controller outputs a signal to disengage the respective locking mechanisms of the differential assemblies selected by the positioning of said first switch when said controller receives a signal indicative of the ground speed of the work machine exceeding said predetermined ground speed.

21. The control system, as set forth in claim 19, wherein said controller outputs a signal to disengage the locking mechanism of the front axle differential when said controller receives a signal indicative of the steering effort exceeding said predetermined amount.

22. A control system for controlling at least one differential assembly associated with a work machine wherein the work machine includes a drive transmission system, a plurality of axles having wheels associated respectively therewith, an interaxle, a differential assembly associated with at least some of the axles including the interaxle for turning the wheels associated with at least some of the axles, each of the differential assemblies having a locking mechanism operable between an unlocked condition wherein wheel turning is unaffected and such wheels turn differentially and a locked condition wherein wheel turning is affected and such wheels turn at the same speed, said control system comprising:

a first switch positionable to select at least one of the differential assemblies for operation in its locked condition, said first switch outputting a signal indicative of the differential assemblies selected for operation in their locked condition;

a second switch actuatable to control the locking of the differential assemblies selected by the positioning of the said first switch, said second switch being actuatable between a first state corresponding to the condition when an operator is not requesting actuation of the locking mechanisms associated with the selected differential assemblies and a second state corresponding to the condition when an operator is requesting actuation of the locking mechanisms associated with the selected differential assemblies;

a ground speed sensor for determining the ground speed of the work machine; and an electronic controller coupled with said first and second switches and with said ground speed sensor for receiving signals therefrom, said controller being operable to receive a signal from said first switch indicative of which differential assemblies have been selected for operation in their locked condition, a signal indicative of when said second switch is in its first or second state, and a signal indicative of the ground speed of the work machine;

said controller outputting a signal to actuate the locking mechanism of the interaxle differential when said controller receives a signal from said first switch indicative of the interaxle differential having been selected for operation in its locked condition, and a signal indicative of said second switch being in its second state; and said controller outputting a signal to actuate the locking mechanism of any remaining selected differential assemblies when said controller receives a signal from said first switch indicative of which additional differential assemblies have been selected for operation in their locked condition, a signal indicative of said second switch being in its second state, and a signal indicative of the ground speed of the work machine being below a predetermined ground speed.

23. The control system, as set forth in claim 22, wherein said controller outputs a signal to disengage the respective locking mechanisms of the differential assemblies selected by the positioning of said first switch except for the interaxle differential when said controller receives a signal indicative of the ground speed of the work machine exceeding said predetermined ground speed.

24. The control system, as set forth in claim 22, wherein said controller outputs a signal to disengage the locking mechanism of the interaxle differential when said controller receives a signal indicative of said second switch being in its first state.

* * * * *